United States Patent Office 3,448,815
Patented June 10, 1969

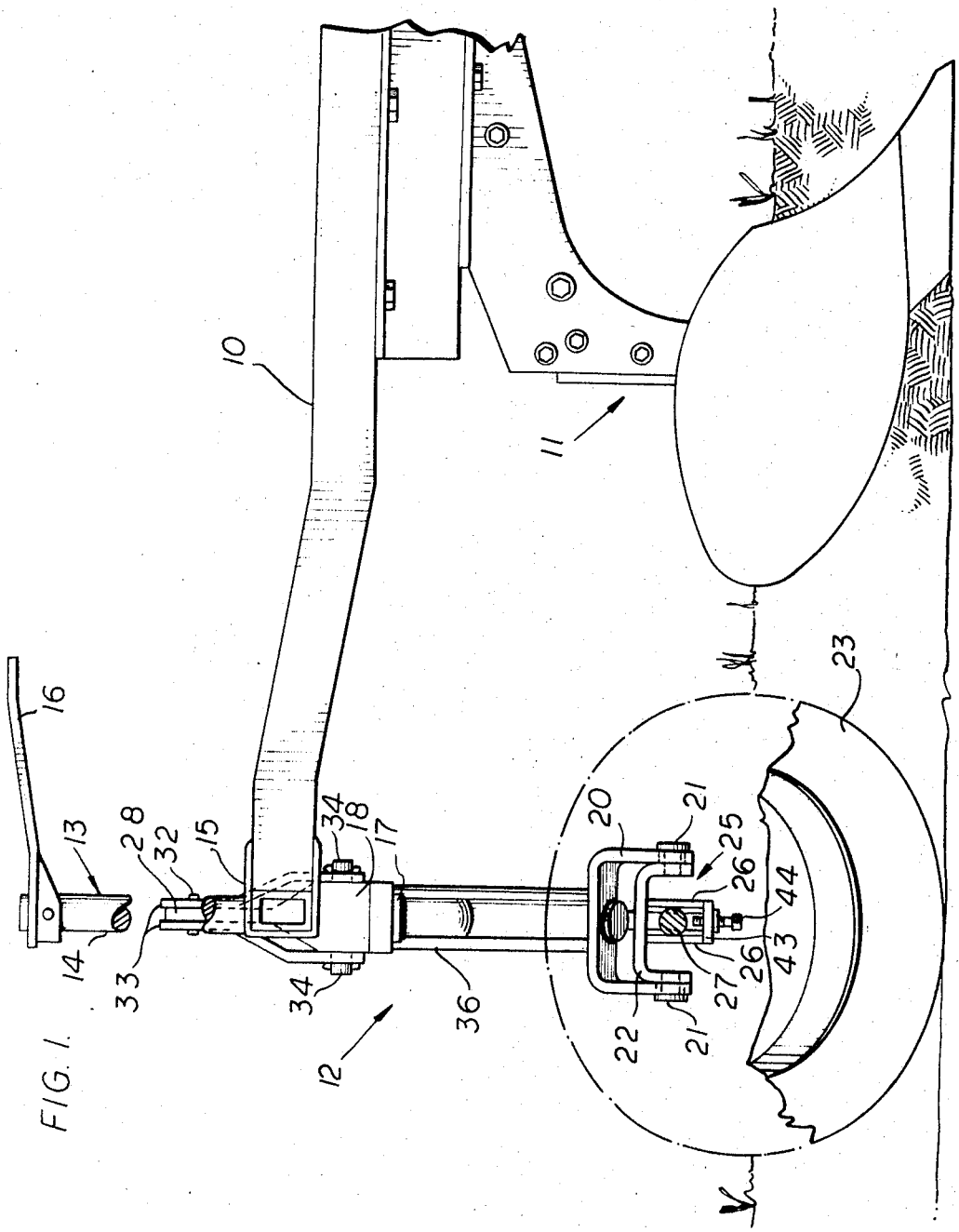

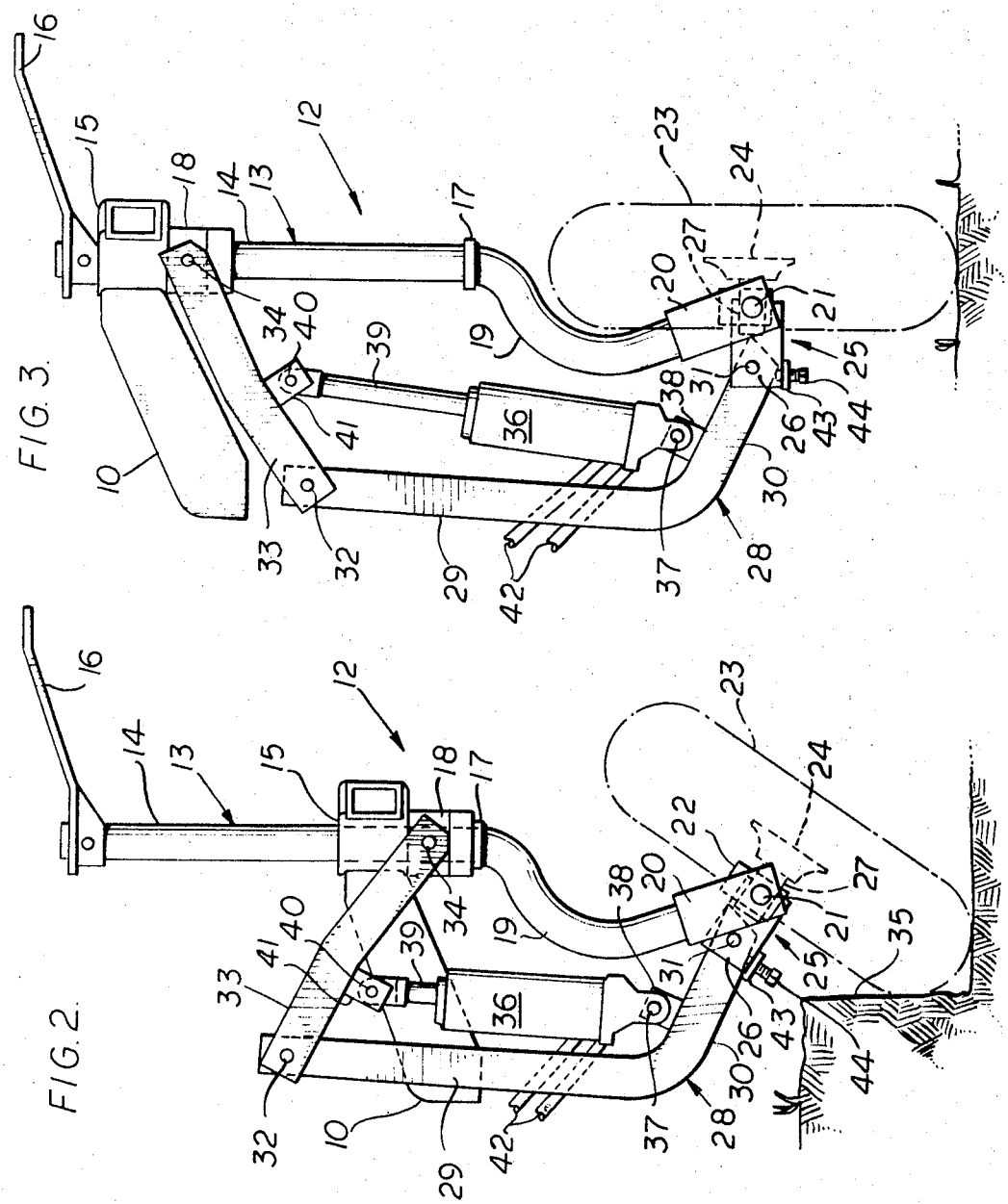

3,448,815
IMPLEMENT SUPPORTING WHEEL
Raymond F. Roberson, Los Angeles, Calif., assignor to International Harvester Company, Chicago, Ill., a corporation of Delaware
Filed Oct. 17, 1966, Ser. No. 587,189
Int. Cl. A01b 69/00, 33/10, 33/12
U.S. Cl. 172—291                                    7 Claims

ABSTRACT OF THE DISCLOSURE

Supporting and lift means for the steerable rear furrow wheel of a plow wherein the wheel is tilted at an angle to the vertical to bear against the furrow wall during operation and is automatically straightened to a vertical position when the implement is raised for transport.

This invention relates to implements and particularly to plows. More specifically the invention concerns a novel supporting wheel mounting for an implement.

An object of the invention is the provision of novel furrow wheel mounting means for an implement including power operated means for raising and lowering the frame relative to the furrow wheel.

Another object of the invention is the provision of a novel steerable supporting wheel arrangement for an implement wherein means are provided for raising and lowering the implement frame relative to the supporting wheel and for simultaneously shifting the wheel from the transport position in which the wheel is disposed in a generally vertical plane to an operating position with the wheel tilted laterally.

Other objects and advantages of the invention will become clear from the following detailed description when read in conjunction with the accompanying drawings wherein:

FIGURE 1 is a diagrammatic view in side elevation of the rear portion of a moldboard plow having mounted on its rear end a furrow wheel assembly incorporating the features of this invention;

FIGURE 2 is a diagrammatic rear elevation of the furrow wheel assembly of this invention showing the furrow wheel in its operating position against the furrow wall formed by the earthworking units; and FIGURE 3 is a view similar to FIGURE 2 showing the relationship of the furrow wheel mounting parts with the implement in transport position.

In the drawings the numeral 10 designates a diagonal beam forming the tool-carrying frame of a moldboard plow having mounted thereon a plurality of earthworking units 11, only one of which is shown, and is adapted to be connected to a tractor.

Beam 10 extends rearwardly beyond the rearmost plow unit 11 and has mounted thereon a furrow wheel assembly 12 comprising a furrow wheel supporting member 13 extending generally vertically and having an upper spindle portion 14 slidably and rotatably mounted in a bearing 15 affixed to the rear end of beam 10.

To the upper end of spindle portion 14 is secured a steering arm 16 adapted to be connected in any suitable manner to motion transmitting means by which the wheel-carrying member 13 may be revolved about its axis.

A collar 17 is welded to the spindle portion 14 which serves as a stop for the lower end of a sleeve 18 slidable on the spindle and having its upper end engageable with bearing 15 at the rear end of frame 10.

The lower end of supporting member 13 is arched as at 19, and to its lower end is affixed a yoke 20, the arms of which are pivoted by pins 21 upon another yoke 22. Wheel 23 is provided with a bearing hub 24 from which inwardly extends an axial projection 25 comprising a pair of plates 26 straddling and secured to a stub shaft 27 rotatably mounted in the hub 24, plates 26 also being affixed to yoke 22.

It should be clear that wheel 23 is swingable about a horizontal longitudinally extending axis represented by pins 21. The rear portion of frame 10 carrying earthworking units 11 is raised and lowered by means operatively connected between the wheel and its supporting member including a link 28 having a vertically directed portion 29 and an outwardly and downwardly bent lower end 30 pivotally mounted by a bolt 31 between plates 26. The upper end of link 29 is pivoted by a pin 32 between a pair of lift arms 33 the other ends of which are mounted upon trunnions 34 carried by sleeve 18.

In FIGURE 2 the implement is in its operating position and wheel 23 is shown bearing against the furrow wall 35. Raising the tool-carrying frame 10 to the transport position of FIGURE 3 while at the same time swinging wheel 23 about its pivot 21 to the generally vertical position shown is accomplished by the provision of extensible means in the form of a hydraulic cylinder 36 pivotally mounted at 37 upon a lug 38 affixed to link 28, having slidable therein a piston rod 39 pivotally connected at 40 to lugs 41 affixed to lift arms 33.

When piston rod 39 is extended in cylinder 36 lift arms 33 are swung about their pivots 32, and projection 25 from wheel 23 is swung downwardly, moving wheel 23 from the tilted position of FIGURE 2 to the generally vertical position of FIGURE 3 to facilitate transport of the implement. For operating cylinder 36 fluid under pressure is supplied thereto though hose lines 42 from a suitable source of fluid under pressure preferably mounted on the vehicle by which the implement is propelled.

Adjustment of the tilt angle of wheel 23 in the furrow formed by the earthworking units is adjustable by the provision of a bar 43 affixed to the lower edges of plates 26 at their rear ends and having therein an aperture to receive a set screw 44 engageable with link 28 to limit relative movement therebetween and plate 26.

It is believed that the construction and operation of the wheel supporting assembly of this invention will be clearly understood from the foregoing description. While the invention has been described in its preferred embodiment, it should be understood it may be applied to furrow wheels mounted at other locations on the implement frame and to other types of supporting wheels.

What is claimed is:
1. In an implement, a tool-carrying frame, a supporting member mounted on the frame for relative movement with respect to the frame to raise and lower the latter, a ground-engaging wheel, pivot means mounting said wheel on said supporting member for swinging relative thereto about a generally horizontal axis extending in the direction of travel to accommodate pivoting the wheel about said axis from a generally upright position when the frame is raised and to a tilted position when the frame is lowered, and extensible means operatively connected between said frame and said wheel effective upon actuation of said extensible means and reacting against said wheel to raise and lower the frame and to simultaneously swing said wheel about its pivot on said supporting member.

2. The invention set forth in claim 1, wherein a projection is affixed to and extends axially from said wheel and said extensible means is operatively connected between said projection and said frame.

3. The invention set forth in claim 2, wherein said supporting member is a generally vertically extending spindle slidably mounted on said tool-carrying frame and rotatable about its axis to steer the wheel.

4. The invention set forth in claim 2, wherein a lift arm is pivotally mounted on said frame and a link is pivotally connected to said projection and to said lift arm, said extensible means being connected at one end to said link and at its other end to said lift arm to raise and lower the frame and to swing said wheel from a generally vertical position when the frame is raised to a laterally tilted position when the frame is lowered.

5. The invention set forth in claim 4, wherein means are provided in the connection between said link and said projection to adjust the angle of said wheel in its laterally tilted position.

6. In an implement, a tool-carrying frame, a supporting member mounted on the frame for relative movement with respect to the frame to raise and lower the latter, a ground-engaging wheel, pivot means mounting said wheel on said supporting member for swinging relative thereto about a generally horizontal axis extending in the direction of travel to accommodate pivoting the wheel from a generally upright position when the frame is raised and to a tilted position when the frame is lowered, an arm pivoted to one end on said frame for swinging in a generally vertical plane, a link pivoted at one end on said arm, means pivotally connecting the other end of said link to said wheel at a location spaced from the pivot of the latter on said supporting member, and extensible means connected between said link and said arm, actuation of said extensible means being effective to vertically swing said arm about its pivot on said link to raise and lower the frame and to swing said wheel about its pivot on said supporting member.

7. The invention set forth in claim 6, wherein said supporting member includes a generally vertical spindle portion slidably mounted on said frame and rotatable about the axis of said spindle portion to accommodate steering said wheel.

References Cited

UNITED STATES PATENTS

| 828,160 | 8/1906 | Weeks | 172—384 |
| 829,558 | 8/1906 | Weeks | 172—283 |

FOREIGN PATENTS 520,828  1/1956  Canada.

ANTONIO F. GUIDA, *Primary Examiner.*

WALTER J. CONLON, *Assistant Examiner.*

U.S. Cl. X.R.

172—384